United States Patent [19]
Tanaka et al.

[11] Patent Number: 5,631,851
[45] Date of Patent: May 20, 1997

[54] METHOD OF MONITORING MACHINING LOAD USING VARIABLE ALARM THRESHOLD

[75] Inventors: Kunio Tanaka, Akishima; Yasushi Onishi; Koji Sato, both of Yamanashi, all of Japan

[73] Assignee: Fanuc Ltd, Minamitsuru, Japan

[21] Appl. No.: 332,402

[22] Filed: Oct. 31, 1994

[30] Foreign Application Priority Data

Nov. 2, 1993 [JP] Japan .................... 5-297307

[51] Int. Cl.⁶ .................................... G06F 19/00
[52] U.S. Cl. .................. 364/551.01; 364/551.02; 364/474.16; 364/554
[58] Field of Search .................. 364/551.01, 551.02, 364/552, 554, 474.15–474.18, 476, 558, 563, 185, 153, 506–508; 73/862.53; 340/680, 825.23, 665

[56] References Cited

U.S. PATENT DOCUMENTS

| | | | |
|---|---|---|---|
| 4,548,066 | 10/1985 | Martinez et al. | 73/849 |
| 4,551,808 | 11/1985 | Smith et al. | 364/185 |
| 4,750,131 | 6/1988 | Martinez | 364/476 |
| 4,855,925 | 8/1989 | Bhateja | 364/474.06 |
| 4,866,429 | 9/1989 | Granere | 340/680 |
| 5,115,403 | 5/1992 | Yoneda et al. | 364/474.15 |
| 5,304,906 | 4/1994 | Arita et al. | 318/568.16 |
| 5,506,786 | 4/1996 | Itoh et al. | 364/474.17 |

FOREIGN PATENT DOCUMENTS

62-46299  10/1987  Japan.
3-196313  8/1991  Japan.

*Primary Examiner*—James P. Trammell
*Attorney, Agent, or Firm*—Staas & Halsey

[57] ABSTRACT

A method of monitoring machining load on a numerically controlled machine tool in such a way that incorrect judgment due to variations in machining load which are caused according to the machining conditions is made less frequent. The method is started by performing plural trial cutting operations. A signal indicating the machining load during these trial cutting operations is sampled and thus, sampling data is obtained. Reference data about the machining load and its variance are calculated from the sampling data and loaded in a reference data table. A threshold value according to variations in the sampling data is established, using the value of the variance. A load monitor means compares the reference data with data about the machining load obtained from actual measurements whenever each interval of time elapses. A decision is made as to whether the difference exceeds the threshold value. In this way, the machining load is monitored.

10 Claims, 6 Drawing Sheets

- - - - - - - THRESHOLD VALUE         $D_i \cdot (1 + a/100)$
- - - - - - - COR. THRESHOLD VALUE    $D_i \cdot (1 + k \cdot a/100)$ a%
——————— REFERENCE DATA         $D_i$
b%

- - - - - - - THRESHOLD VALUE         $D_i \cdot (1 - k \cdot b/100)$
- - - - - - - COR. THRESHOLD VALUE    $D_i \cdot (1 - b/100)$

FIG. 8

$D_i \cdot (1 + a/100)$
$D_i \cdot (1 + k \cdot a/100)$
$D_i$
$D_i \cdot (1 - k \cdot b/100)$
$D_i \cdot (1 - b/100)$

FIG. 9

| VARIANCE $\sigma^2$ | COEFFICIENT k | ALLOWED AMOUNT % | COR. THRESHOLD VALUE |
|---|---|---|---|
| $\sigma_1^2$ | $k_1 = \sigma_1 / \sigma_{max}$ | $a_1 = k_1 \cdot a$ | $D_1 \cdot (1 + k_1 \cdot a/100)$ |
| $\sigma_2^2$ | $k_2 = \sigma_2 / \sigma_{max}$ | $a_2 = k_2 \cdot a$ | $D_2 \cdot (1 + k_2 \cdot a/100)$ |
| $\sigma_i^2$ | $k_i = \sigma_i / \sigma_{max}$ | $a_i = k_i \cdot a$ | $D_i \cdot (1 + k_i \cdot a/100)$ |

FIG. 10

| VARIANCE $\sigma^2$ | COEFFICIENT k | ALLOWED AMOUNT % | COR. THRESHOLD VALUE |
|---|---|---|---|
| $\sigma_1^2$ | $k_1 = \sigma_1 / \sigma_{mean}$ | $a_1 = k_1 \cdot a$ | $D_1 \cdot (1 + k_1 \cdot a/100)$ |
| $\sigma_2^2$ | $k_2 = \sigma_2 / \sigma_{mean}$ | $a_2 = k_2 \cdot a$ | $D_2 \cdot (1 + k_2 \cdot a/100)$ |
| $\sigma_i^2$ | $k_i = \sigma_i / \sigma_{mean}$ | $a_i = k_i \cdot a$ | $D_i \cdot (1 + k_i \cdot a/100)$ |

FIG. 11

- - - - THRESHOLD VALUE $D_i + A$
- · - · COR. THRESHOLD VALUE $D_i + A \cdot k$
——— REFERENCE DATA $D_i$
- - - - THRESHOLD VALUE $D_i - B \cdot k$
- · - · COR. THRESHOLD VALUE $D_i - B$

FIG. 12

$D_i + A$
$D_i + A \cdot k$
$D_i$
$D_i - B \cdot k$
$D_i - B$

FIG. 13

| VARIANCE $\sigma^2$ | COEFFICIENT k | ALLOWED VALUE | COR. THRESHOLD VALUE |
|---|---|---|---|
| $\sigma_1^2$ | $k_1 = \sigma_1 / \sigma_{max}$ | $A_1 = k_1 \cdot A$ | $D_1 + k_1 \cdot A$ |
| $\sigma_2^2$ | $k_2 = \sigma_2 / \sigma_{max}$ | $A_2 = k_2 \cdot A$ | $D_2 + k_2 \cdot A$ |
| ⋮ | ⋮ | ⋮ | ⋮ |
| $\sigma_i^2$ | $k_i = \sigma_i / \sigma_{max}$ | $A_i = k_i \cdot A$ | $D_i + k_i \cdot A$ |
| ⋮ | ⋮ | ⋮ | ⋮ |

FIG. 14

| VARIANCE $\sigma^2$ | COEFFICIENT k | ALLOWED VALUE | COR. THRESHOLD VALUE |
|---|---|---|---|
| $\sigma_1^2$ | $k_1 = \sigma_1 / \sigma_{mean}$ | $A_1 = k_1 \cdot A$ | $D_1 + k_1 \cdot A$ |
| $\sigma_2^2$ | $k_2 = \sigma_2 / \sigma_{mean}$ | $A_2 = k_2 \cdot A$ | $D_2 + k_2 \cdot A$ |
| ⋮ | ⋮ | ⋮ | ⋮ |
| $\sigma_i^2$ | $k_i = \sigma_i / \sigma_{mean}$ | $A_i = k_i \cdot A$ | $D_i + k_i \cdot A$ |
| ⋮ | ⋮ | ⋮ | ⋮ |

METHOD OF MONITORING MACHINING LOAD USING VARIABLE ALARM THRESHOLD

BACKGROUND OF THE INVENTION

1. Field of the Invention

The present invention relates to a method of monitoring the load on a numerically controlled machine tool when it is performing a machining operation and, more particularly, to a machining load-monitoring method in which data obtained by sampling a signal indicating the machining load is compared with reference data to monitor the state of the workpiece being machined.

2. Description of the Related Art

In a numerically controlled machine tool, the machining load is monitored. If this machining load exceeds a given level, or if the difference between the machining load and reference data exceeds a certain value, then an alarm is given to interrupt the machining operation or to lower the cutting feed speed. In this way, the tool is prevented from getting damaged, also, the workpiece is prevented from being machined badly. This machining load contains load on servomotors applied during rapid feed, as well as load imposed during cutting.

Figure 17:
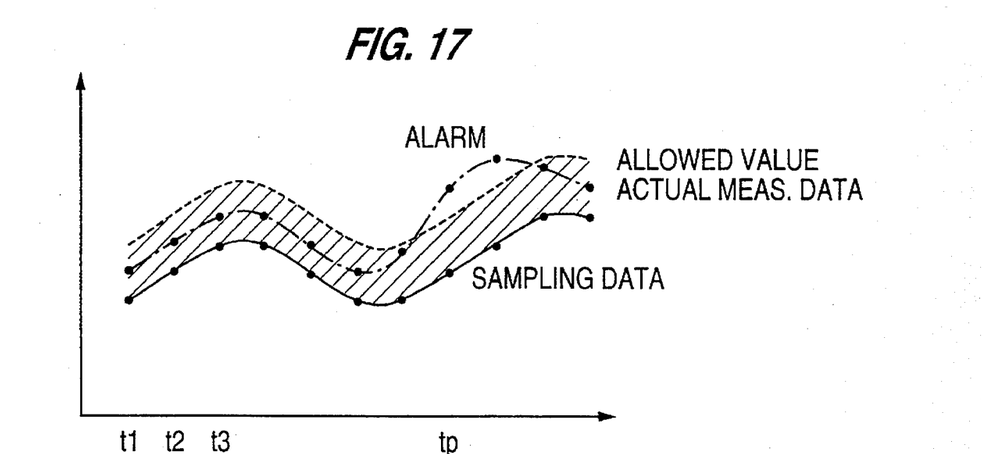
FIG. 17 is a graph illustrating comparison of sampling data with actual measurement data.

The following method is known as a method of implementing the above-described method of monitoring the machining load. A trial cutting operation is once performed. A signal indicating the machining load imposed during the trial cutting is sampled at regular intervals of time. In this way, data (hereinafter referred to as the sampling data) about the load is collected. Then, an actual cutting operation is carried out. During this actual cutting operation, data (hereinafter referred to as the actual measurement data) obtained by actual measurements is compared with reference data which is the sampling data. In this way, the machining load is monitored. FIG. 17 is a diagram illustrating comparison between the sampling data and the actual measurement data. In this diagram, time is plotted on the horizontal axis, and load torque on an electric motor is plotted on the vertical axis. As shown, the sampling data about the machining load is compared with the actual measurement data at regular intervals of time such as at t1, t2, t3, . . . , tp, . . . In this manner, the machining load is monitored. For example, if the difference between the sampling data and the actual measurement data at instant tp is in excess of a certain value, or a tolerance, an alarm is issued. In response to this, the machining operation performed by the numerically controlled machine tool is stopped or the cutting speed is lowered, thus reducing the load. Also, if necessary, the tool may be replaced with another one.

A method of finding the above-described machining load by estimating a disturbance load torque, using a state observer, is known, as described in Japanese Patent Laid-Open No. 196313/1991.

However, in the conventional machining load-monitoring method described above, the reference data used for monitoring the machining tool varies and so accurate decision may not be made. This problem is described in further detail. The reference data is found, based on the sampling data derived during a trial cutting operation. Data about the machining load obtained by sampling the resulting signal during the trial cutting is affected by various factors such as the tool used for the trial cutting, variations in the machined works, and the used cutting fluid. Therefore, where the reference data is obtained from one trial cutting operation, the reference data does not always precisely represent the machining load during the cutting.

For instance, where the machining load varies widely the values of the machining load measured during a trial cutting operation differ widely from each other. For this reason, a given threshold value is exceeded more frequently than where the machining load varies less widely. Consequently, variations in the machining load caused by variations in tools used during actual cutting operation or by variations in the machined works may be misinterpreted as wrong machining.

SUMMARY OF THE INVENTION

It is an object of the present invention to provide a machining load-monitoring method which is free of the foregoing problems and reduces misinterpretations that would otherwise be caused by variations in the machining load due to varying machining conditions.

In the novel machining load-monitoring method, plural trial cutting operations are performed. During these trial cutting operations, signals indicating the machining load are sampled to obtain sampling data. The mean value of the found sampling data sets is calculated. Also, a variance indicating the degree of variation of the machining load is found.

A coefficient corresponding to the degree of variation of the machining load is found, using the found variance. This coefficient is multiplied by a preset threshold value. In this way, the threshold value is corrected for the degree of variation. As a result, a corrected threshold value is established.

Where the machining load is monitored, using data obtained by actual measurements, the actual measurement data is compared with the found reference data at regular intervals of time. Then, a decision is made as to whether the difference is in excess of the calculated, corrected threshold value.

The sampling data, data about the variance, and the reference data can be loaded in a data table. When a comparison with actual measurement data is made, the data can be fetched from the table.

Other objects and features of the invention will appear in the course of the description thereof, which follows.

DETAILED DESCRIPTION OF THE PREFERRED EMBODIMENTS (Configuration for Embodying the Present Invention)

Figure 15:
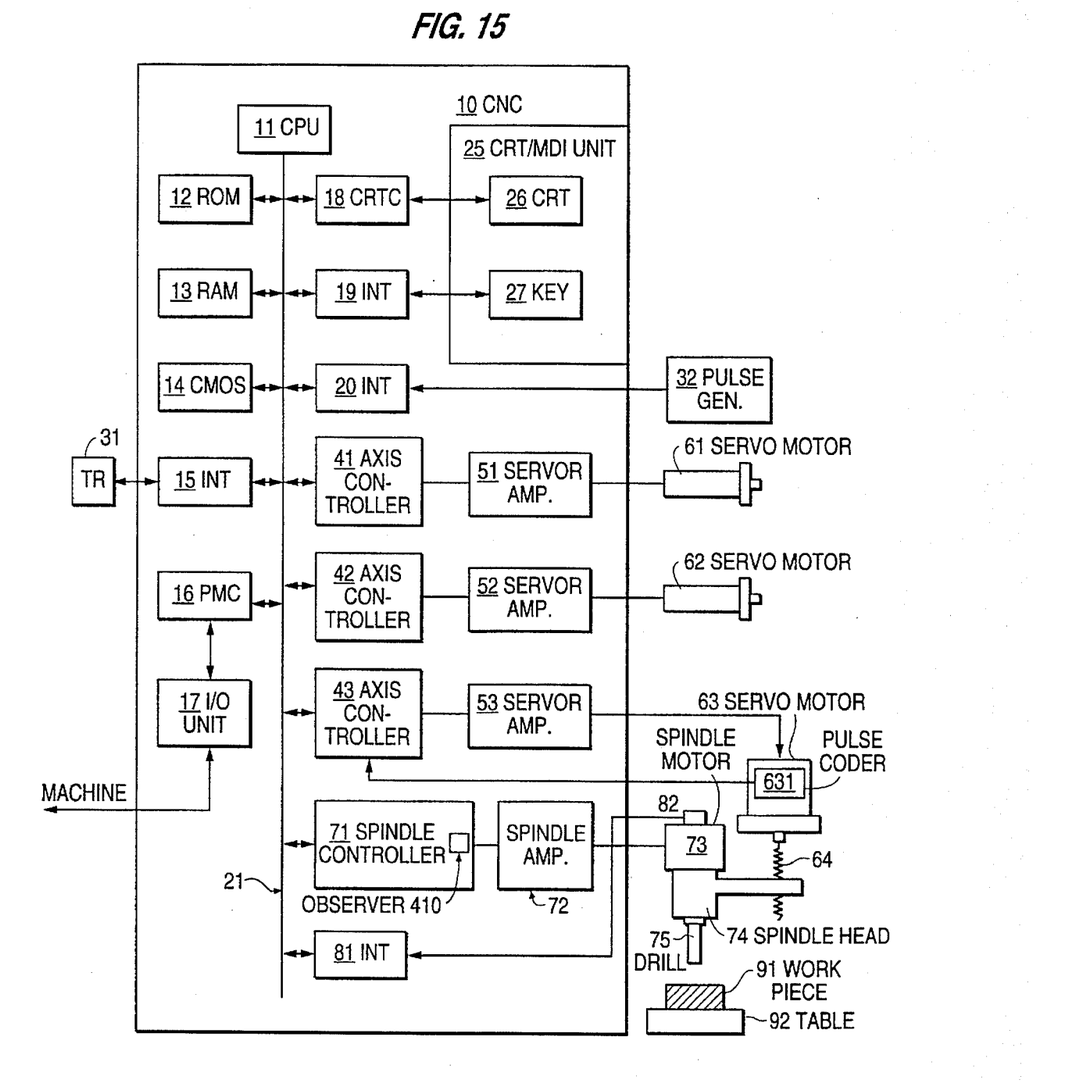
FIG. 15 is a block diagram of a numerically controlled machine tool for implementing a machining load-monitoring method according to the invention.

A machine for implementing a machining load-monitoring method according to the present invention is first described with reference to FIG. 15, where a computer numerical control (CNC) machine is indicated by reference numeral 10. A processor 11 (also known as a CPU) included in the CNC machine 10 controls the whole CNC machine 10. This processor 11 reads out a system program stored in a ROM 12 via a bus 21 and controls the whole CNC machine 10 according to the system program. A RAM 13 provides storage means for temporarily holding data about calculations, displayed data, and other data. An SRAM can be used as the RAM 13. A CMOS 14 provides storage means for storing programs about machining operations and various parameters. The CMOS 14 is backed up by an auxiliary power supply such as a battery (not shown). If the power supply (not shown) for the CNC machine 10 is off, the CMOS 14 acts as a nonvolatile memory preserving data.

An interface 15 is used for connection with an external device (TR) 31 such as a paper tape reader, paper tape puncher, or paper tape reader/puncher. Programs for machining operations are read by a paper tape reader and read into the CNC machine 10 through the interface 15. A machining program edited within the CNC machine 10 can be output to the paper tape puncher.

A programmable machine controller (PMC) 16 is incorporated in the CNC machine 10 and controls the machine under control of a sequence program written in the form of a ladder. Specifically, the controller 16 converts a machining program into signals required by the machine according to M, S, and T functions dictated within the program, and sends the signals to the machine through an input/output (I/O) unit 17. The output signal from the I/O unit 17 activates magnets and other components of the machine to drive hydraulic valves, pneumatic valves, electric actuators, etc. The programmable machine controller 16 receives signals from limit switches mounted in the machine and signals from switches and other components on a numerical-control console (not shown), processes the signals, and transmits them to the CPU 11.

A graphical control unit 18 converts digital data about the present position of each axis, data about an alarm, data about parameters, image data, and other digital data into image signals. The image signals from the graphical control unit 18 are sent to a CRT 26 for use with a CRT/MDI unit 25 to display images. Another interface 19 receives data from a keyboard 27 installed on the CRT/MDI unit 25, and transmits the data to the CPU 11.

A further interface 20 is connected with a manual pulse generator 32 and receives pulses from the pulse generator 32, which is mounted on the numerical-control console (not shown). When the mechanical moving part is accurately located in a desired position, the manual pulse generator 32 is used.

Axis control circuits 41–43 receive axis moving commands from the CPU 11 and produce command to servoamplifiers 51–53, respectively, so as to control the axes. The servoamplifiers 51–53 receiving the moving commands drive servomotors 61–63 for the axes, respectively. The servomotor 63 for controlling feed along the z-axis rotates a ball screw 64 so that the position of a spindle head 74 connected with a spindle motor 73 in the z-axis direction and the feed speed may be controlled. A position-detecting pulse coder 631 is included in the servomotor 63. A position signal from this pulse coder 631 is fed as a pulse train back to the axis control circuit 43. Similarly, the servomotors 61 and 62 for controlling feeds in the x- and y-axis directions, respectively, incorporate position-detecting pulse coders (not shown) similar to the pulse coder in the servomotor 63. Position signals from these pulse coders are fed as pulse trains back to the respective axis control circuits. As the means for detecting the position, linear scales may be used instead of the position-detecting pulse coders. Furthermore, the frequencies of the pulse trains may be converted into speeds to produce speed signals. A processor (not shown) causes the axis control circuit 43 to perform processing in software.

A spindle control circuit 71 receives spindle-rotating commands and spindle-orienting commands and produces a signal indicating a spindle speed to a spindle amplifier 72. The spindle amplifier 72 receiving this spindle speed signal rotates the spindle motor 73 at the instructed rotational speed. Also, the spindle is placed in position under the spindle-orienting command.

A position coder 82 is coupled to the spindle motor 73 via a gear or a belt. This position coder 82 rotates in synchronism with the spindle motor 73 and produces feedback pulses. The feedback pulses are sent via an interface 81 to the CPU 11, where the pulses are read. The CPU 11 moves the other axes in synchronism with the spindle motor 73 to perform a drilling operation or other machining operation.

These feedback pulses are converted into a speed signal by the CPU 11. This speed signal indicating the speed of the spindle motor 73 is fed to the spindle control circuit 71. This spindle control circuit 71 incorporates an observer 410 for estimating a disturbance load torque (described later). The observer 410 estimates the disturbance load torque on the spindle motor 73, excluding the component attributed to the acceleration of the motor 73, and finds the machining load.

A drill 75 is attached to the spindle head 74 on the spindle motor 73. Rotation of the drill 75 is controlled by the spindle motor 73. The position of the drill 75 in the z-axis direction and the feed speed are controlled by the servomotor 63 via the spindle head 74.

The drill 75 drills a hole in a workpiece 91 fed in the z-axis direction by the servomotor 63. This workpiece 91 is held to a table 92 which is in turn moved in the x- and y-axis directions by the x-axis servomotor 61 and the y-axis servomotor 62, respectively, under the control of a mechanism (not shown).

(Configuration of Disturbance-Estimating Observer)

Figure 16:
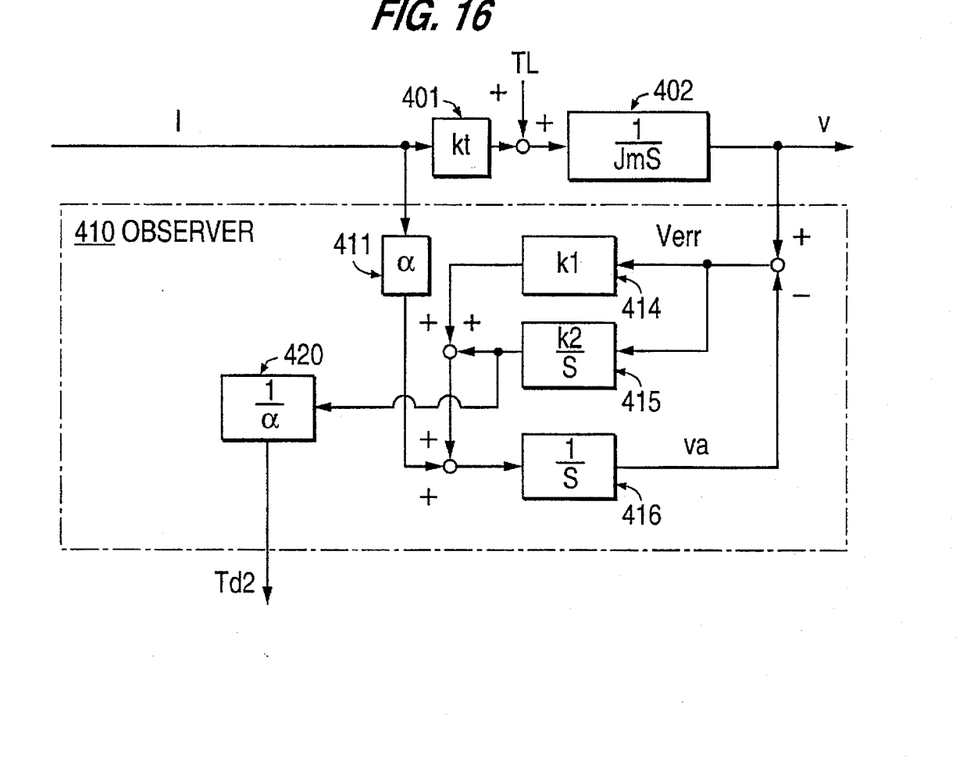
FIG. 16 is a block diagram illustrating a state observer used to estimate a disturbance load torque.

The observer 410 for estimating the disturbance load torque is described now. FIG. 16 is a block diagram of the observer for estimating the disturbance load torque which includes a cutting torque and the frictional torque of the mechanical portion. This disturbance load torque is equal to the total torque of the motor minus accelerating/decelerating torque for acceleration and deceleration. Therefore, if the frictional torque of the mechanical portion is neglected, then the disturbance load torque can be regarded as the cutting load torque.

In FIG. 16, indicated by 401 is a transfer function having a torque constant kt. A torque command I is entered. Indicated by v is a speed. Indicated by TL is a disturbance torque. In the block diagram of FIG. 16, if an observer for estimating the speed v and the disturbance torque TL is built by an ordinary procedure, then the observer takes the form indicated by 410.

The disturbance-estimating observer 410 includes terms 414 and 415 which contain parameters k1 and k2, respectively, of the disturbance-estimating observer. Included in another term 411 is $\alpha$ which is the value of a parameter by which a current value I is multiplied. This current value I is actually supplied to the servomotors and forms a torque command. The torque constant of the motor is estimated to be $kt^*$. The inertia of the motor is estimated to be $Jm^*$. The $\alpha$ is expressed by the estimated torque constant $kt^*$ divided by the estimated inertia $Jm^*$, i.e., $\alpha=kt^*/Jm^*$. A term 416 is an integral term which integrates the total sum of the outputs from the terms 411, 414, and 415, and finds the estimated speed va of the motor. A term 420 produces the product of the output from the term 415 and $(1/\alpha)$ to find an estimated disturbance torque Td2.

In the block diagram of FIG. 16, the relation $\alpha=kt^*/Jm^*$ holds. It is assumed that the torque constant kt of the motor is equal to its estimated value $kt^*$, i.e., $kt=kt^*$. The inertia Jm of the motor is analyzed, using its estimated value $Jm^*$ as the inertia ($Jm=Jm^*$).

A calculation performed in the term 402 results in $$(I \cdot kt + TL)(1/Jm \cdot S) = v \quad (1)$$

By considering the output va from the term 416, we have $$\{I \cdot (kt/Jm) + (v-va)k1 + (v-va)(k2/S)\} \cdot (1/S) = va \quad (2)$$

By modifying Eq. (1), we get $$I = (v \cdot Jm \cdot S - TL)/kt \quad (3)$$

By substituting Eq. (3) into Eq. (2) and rearranging the formula, we have the following Eqs. (4) and (5):

$$(v \cdot Jm \cdot S - TL)/Jm + (v-va)k1 + (v-va)(k2/S) = va \cdot S \quad (4)$$

$$S(v-va) + (v-va) \cdot k1 + (v-va)(k2/S) = TL/Jm \quad (5)$$

By finding Verr ($=v-va$) from Eq. (5), we have $$\begin{aligned} Verr &= v - va \\ &= (TL/Jm)[1/\{S + k1 + (k2/S)\}] \end{aligned} \quad (6)$$

The output Td1 from the term 415 is calculated from Eq. (6) above and given by $$\begin{aligned} Td1 &= Verr \cdot (k2/S) \\ &= (TL/Jm)\{k2/(S^2 + k1 \cdot S + k2)\} \end{aligned} \quad (7)$$

In Eq. (7), if the parameters k1 and k2 are so selected as to stabilize the pole, Eq. (7) can be approximated by $$Td1 = TL/Jm.$$

This relational formula shows that the total disturbance torque Td1 can be estimated.

In the term 420, the total disturbance torque Td1 is multiplied by $1/\alpha$ ($=Jm^*/kt^*$) to find the estimated disturbance torque Td2. In this way, the disturbance load torque of the motor can be estimated, using the observer. If the frictional torque of the mechanical portion is neglected, the estimated disturbance load torque can be regarded as the cutting load torque.

(Configuration of the Novel Machining Load-Monitoring Method)

Figure 1:
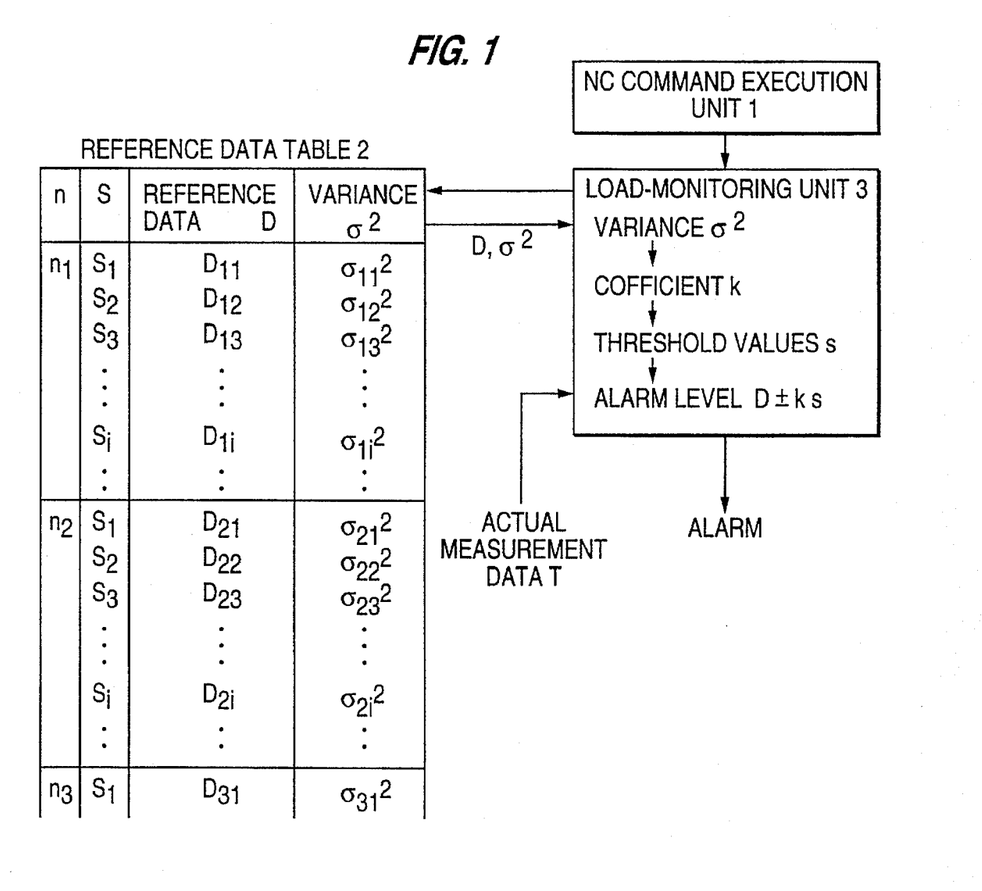
FIG. 1 is a diagram illustrating a machining load-monitoring method according to the present invention.

The concept of the novel machining load-monitoring method is next described by referring to the diagram of FIG. 1.

An NC command execution unit 1 executes ordinary processing under NC commands, and sends signals indicating the contents n of the executed processing and the timing of the execution and other data to a load-monitoring unit 3. Various kinds of data are loaded in a reference data table 2. These data and data obtained by actual measurements are entered into the load-monitoring means 3. Modes of operation in which the contents n of the processing are carried out include a cutting mode, a fast feed mode, and an unactivated mode.

The reference data table 2 is stored in a memory providing storage means for storing reference data D and variance $\sigma^2$ at each instant of sampling. In response to the contents n of each process, plural trial cutting operations are performed. During each process, a signal indicating the load torque is sampled to obtain sampling data, which is then stored in the storage means. For example, during process $n_1$, data $D_{11}$ is obtained as reference data D at sampling instant of time $S_1$. Its variance $\sigma^2$ is $\sigma_{11}^2$. During process $n_2$, $D_{21}$ is obtained as reference data D at sampling instant of time $S_1$. Its variance $\sigma^2$ is $\sigma_{21}^2$. These sampling instants of time correspond to machining steps of each machining process. We can see that the magnitude and variation of the machining load at each sampling instant represent the magnitude and variation of the machining load in each machining step.

Figure 2:
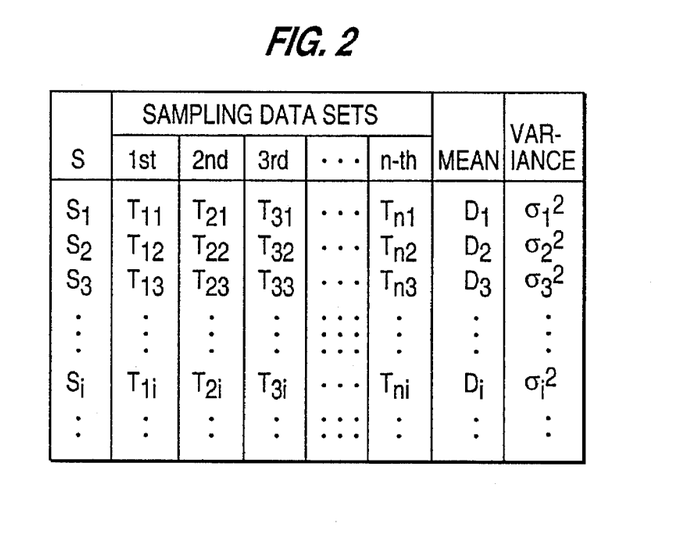
FIG. 2 is a table containing reference data D and its variance $\sigma^2$.

The reference data D and its variance $\sigma^2$ are next described by referring to FIGS. 2–6. FIG. 2 is a table of sampling data, reference data D, and its variance $\sigma^2$. FIGS. 3–6 are graphs illustrating sampling data.

Figure 3:
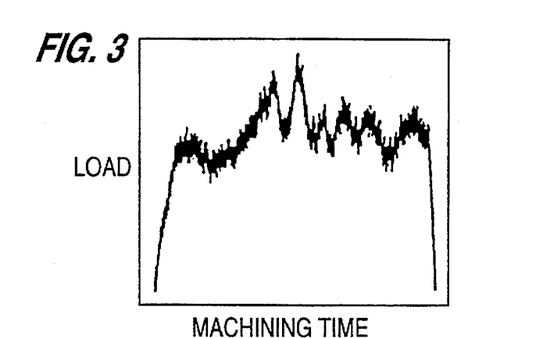
FIG. 3 is a graph illustrating one kind of sampling data.
Figure 4:
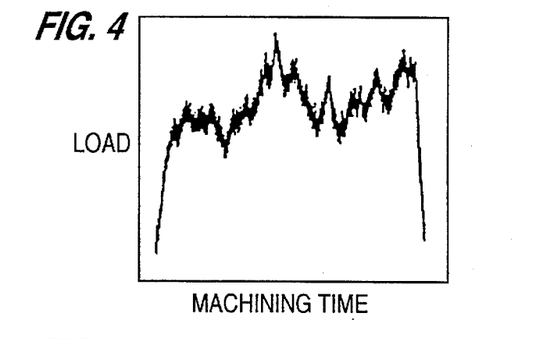
FIG. 4 is a graph illustrating another kind of sampling data.
Figure 5:
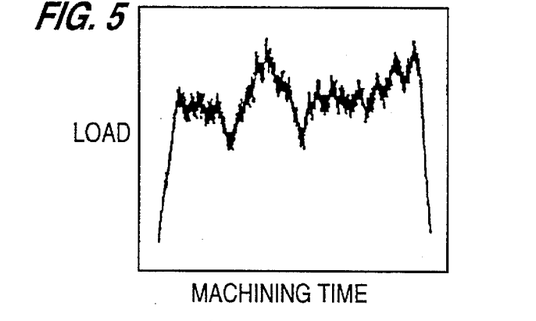
FIG. 5 is a graph illustrating a further kind of sampling data.

In FIGS. 3–5, the load is plotted against time, for showing variations in the load in the same machining processing under the same conditions. As can be seen from these graphs, the load does not assume the same value although under the same conditions. For example, let data illustrated in FIG. 3 be a first set of sampling data. Let data illustrated in FIG. 4 be a second set of sampling data. Let data illustrated in FIG. 5 be a third set of sampling data. Loads assume values $T_{11}$, $T_{21}$, and $T_{31}$, respectively, at sampling instant $S_1$, as shown in the Table of FIG. 2. Loads take values $T_{12}$, $T_{22}$, and $T_{32}$, respectively, at sampling instant $S_2$.

Figure 6:
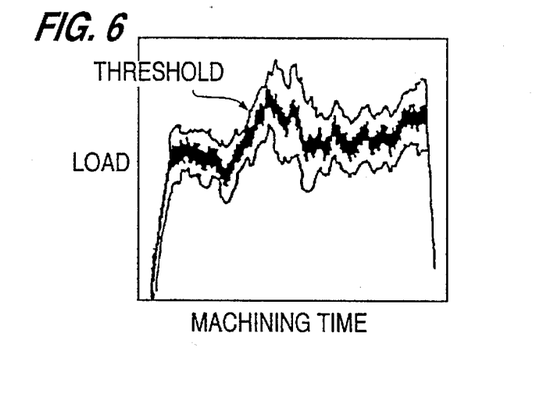
FIG. 6 is a graph illustrating reference data used in the present invention.

Plural sets of sampling data are obtained from plural measurements. The mean value of the values indicated by these sampling data sets is calculated for each sampling instant. The calculated mean value is taken as reference data D. For example, $D_1$ is obtained as the reference data D at sampling instant $S_1$. Reference data D at sampling instant $S_2$ are $D_2$, and at $S_i$, $D_i$. Their variances at the sampling instants are $\sigma_1^2$, $\sigma_2^2$, $\sigma_3^2$, ... $\sigma_i^2$. By calculating the mean value of the sampling data sets, the effect of the variations in the machining load is reduced. Furthermore, the effect of the variations in the machining load is decreased by altering the threshold values used for making decisions as to whether an alarm should be issued, according to the variances, as described later. For example, where large variations take place, the threshold values are set to large values so that the alarm may be issued less frequently. Where small variations occur, the threshold values are set to small values to enhance the monitoring accuracy. FIG. 6 illustrates the reference data D obtained as described above.

The load-monitoring means 3 receives the reference data D from the reference data table 2, its variance $\sigma^2$, and data T obtained by actual measurements, and makes a decision as to whether the actual measurement data T lies within the range of the alarm level determined by the reference data D and its variance $\sigma^2$ or as to whether the actual measurement data exceeds the alarm level whenever a certain time interval passes. If the alarm level is exceeded, an alarm signal is produced. The CNC machine 10 stops the machining operation of the numerically controlled machine tool in response to the alarm signal or lowers the cutting speed so as to reduce the load. If necessary, the tool is exchanged or other processing is performed. The alarm level is shown in FIG. 6, together with the reference data.

(Setting of Alarm Level)

The setting of the alarm level described above is described below. The alarm level is set by the novel machining load-monitoring method, using the reference data D and its variance $\sigma^2$. The magnitude of the threshold value s indicating the amount of allowance for the actual measurement data, or the permitted deviation of the actual measurement data from the reference data, is varied according to the magnitude of the variance $\sigma^2$. With respect to a machined workpiece part providing a large value of variance $\sigma^2$ and large variations in the load torque, the threshold value s is set to a large value, and the alarm level is set to a high level. This reduces the possibility that variations in the load torque are misinterpreted as arising from faulty machining. With respect to a machined workpiece part providing a small value of variance $\sigma^2$ and small variations in the load torque, the threshold value s is set to a small value, and the alarm level is set to a low level. In this state, the machining load is monitored at a high accuracy.

The threshold value s is modified, using the variance $\sigma^2$, in the manner described now. A coefficient k is set according to the magnitude of the variance $\sigma^2$. The threshold value s is multiplied by the coefficient k, thus calculating a corrected threshold value k·s. The alarm level is found by adjusting the corrected threshold value k·s for the reference data D.

Figure 7:
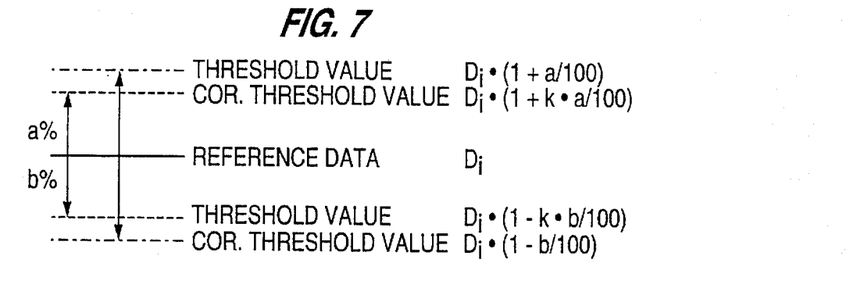
FIG. 7 is a diagram illustrating the relations among reference data, threshold values, and corrected threshold values.
Figure 8:
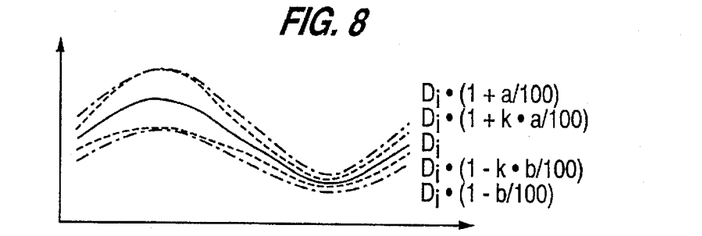
FIG. 8 is a graph illustrating the relations among reference data, threshold values, and corrected threshold values.
Figure 9:
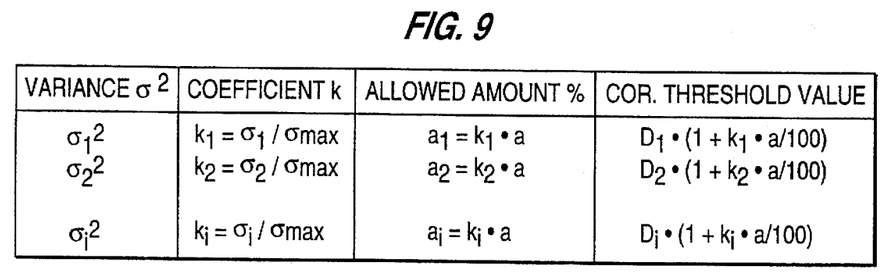
FIG. 9 is a table containing values of coefficient k and corrected threshold values used when a first alarm level is established.

First and second examples of setting the alarm level are described by referring to FIGS. 7–10. In the first example, the threshold value indicating the permitted range of the reference data is expressed in percent against the value of reference data $D_i$. It is assumed that the permitted range extends a% upward from the reference data $D_i$ and b% downward from the reference data. As shown in FIGS. 7 and 8, the upper threshold value is $D_i \cdot (1+a/100)$, while the lower threshold value is $D_i \cdot (1-b/100)$. In FIGS. 7 and 8, the reference data is indicated by the full lines, the initially set threshold values are indicated by the dashed lines, and the corrected threshold values are indicated by the broken lines.

Where the threshold values are expressed in percent, the alarm level is set in the first example in the manner described below. FIG. 9 is a table indicating values of the coefficient k and the corrected threshold values used when the alarm level is set in the first example. In this first example of setting of the alarm level, coefficient $k_i$ for determining the allowed amount is given by $k_i = \sigma_i / \sigma_{max}$, where $\sigma_i$ is the square root of the variance $\sigma_i^2$ and $\sigma_{max}$ is the square root of the maximum variance $\sigma_{max}^2$ of the variances $\sigma^2$ found in each process.

Let the initially set allowed amount above the reference data be a%. The allowed amount $a_i$ expressed in percent is determined by the coefficient $k_i$, i.e., given by $a_i = k_i \cdot a$. In this way, an allowed amount is set according to the degree of variation of the reference data. If this allowed amount $a_i$ is used, the upper threshold value for the reference data $D_i$ is given by $D_i \cdot (1+a_i/100) = D_i \cdot (1+k_i \cdot a/100)$.

Similarly, let the initially set allowed amount under the reference data be b%. The lower threshold value for the reference data $D_i$ is given by $$D_i \cdot (1-b_i/100) = D_i \cdot (1-k_i b/100).$$

In the first example of setting of the alarm level, the coefficient $k_i$ is determined from ($\sigma_i / \sigma_{max}$) as described above. The maximum one of the corrected threshold values is taken as the initially set threshold value. That is, corrected threshold values are set less than the threshold value.

Figure 10:
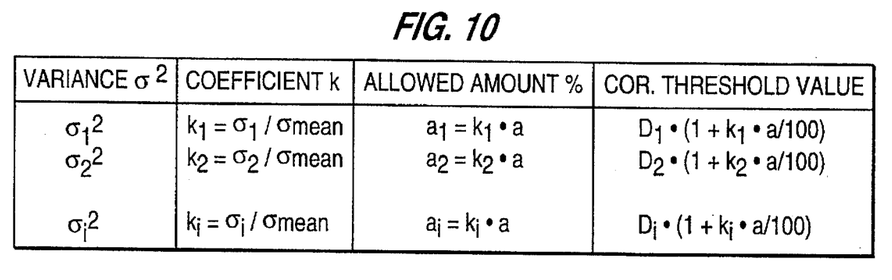
FIG. 10 is a table containing values of coefficient k and corrected threshold values used when a second alarm level is established.

The second example of setting of the alarm level in which the threshold value is expressed in percent is now described. FIG. 10 is a table of values of coefficient k and corrected threshold values used in the second example, where the coefficient $k_i$ determining the allowed amount is given by $k_i = \sigma_i / \sigma_{mean}$, where $\sigma_i$ is the square root of the variance $\sigma_i^2$ and $\sigma_{mean}$ is the square root of the variance $\sigma_{mean}^2$ that is the mean value of the variances $\sigma^2$ found in each process.

This coefficient $k_i$ is used in the same way as in the first example described above. Let the initially set allowed amount above the reference data be a%. The allowed amount $a_i$ expressed in percent is determined from the relation $a_i = k_i \cdot a$. Using this allowed amount $a_i$, the upper threshold value for the reference data $D_i$ is determined from the relationship $$D_i \cdot (1+a_i/100) = D_i \cdot (1+k_i a/100).$$

Similarly, let the initially set allowed amount be b% under the reference data. The lower threshold value for the reference data $D_i$ is given by $$D_i \cdot (1-b_i/100) = D_i \cdot (1-k_i b/100).$$

In the second example, the coefficient $k_i$ is determined from the relation ($\sigma_i / \sigma_{mean}$). First, a threshold value is set at a portion which provides mean variations. Threshold values are set above and below that portion according to the variations. In this way, corrected threshold values are set.

Figure 11:
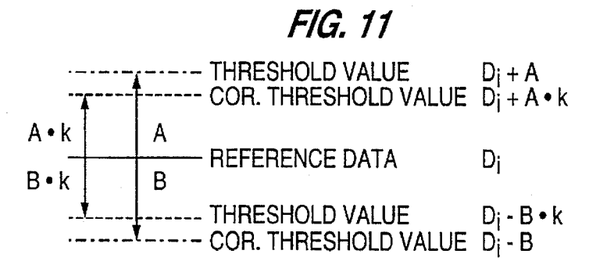
FIG. 11 is a diagram illustrating the relations among reference data, threshold values, and corrected threshold values.
Figure 12:
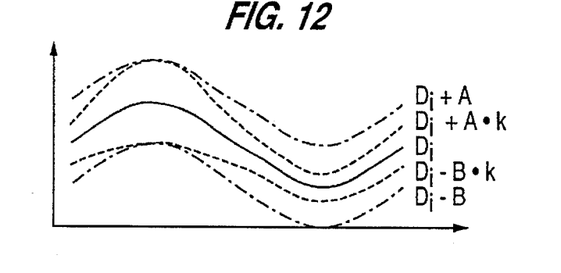
FIG. 12 is a graph illustrating the relations among reference data, threshold values, and corrected threshold values.
Figure 13:
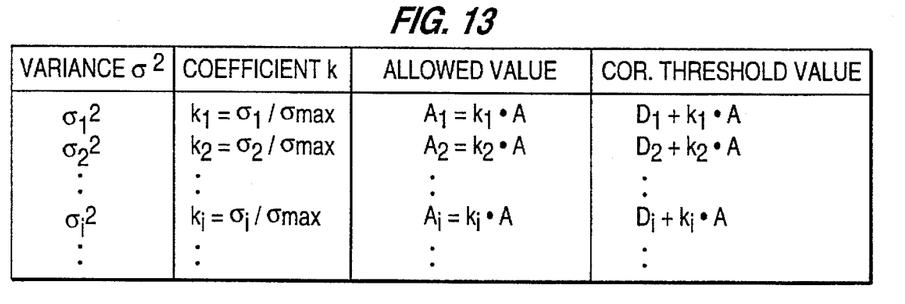
FIG. 13 is a table containing values of coefficient k and corrected threshold values used when a third alarm level is established.

Third and fourth examples of setting the alarm level are described by referring to FIGS. 11–14. In these third and fourth examples, threshold values expressing an allowed range of the reference data is set by representing values of the reference data $D_i$ in terms of absolute amount. It is assumed that the allowed range extends A upward and B downward from the reference data $D_i$. As shown in FIGS. 11 and 12, the upper threshold value is $D_i + A$, whereas the lower threshold value is $D_i - B$. In FIGS. 11 and 12, the reference data is indicated by the full lines. The initially set threshold values are indicated by the broken lines. Corrected threshold values are indicated by the broken lines.

Where the reference data is expressed in terms of absolute amount, the alarm level is set in the third example in the manner described now. FIG. 13 is a table of values of coefficient k and corrected threshold values used in the third example, where coefficient $k_i$ determining the allowed amount is determined from the relation $k_i = \sigma_i / \sigma_{max}$, where $\sigma_i$ is the square root of the variance $\sigma_i^2$ and $\sigma_{max}$ is the square root of the maximum variance $\sigma_{max}^2$ of the variances $\sigma^2$ found in each process.

Let A be the initially set allowed amount above the reference data. The absolute value $A_i$ of the allowed amount is determined by the coefficient $k_i$, i.e., established from the relation $A_i = k_i \cdot A$. Thus, the allowed amount is set according to the degree of variation of the reference data. The upper threshold value is determined with respect to the reference $D_i$ by this allowed amount $A_i$, i.e., given by $$D_i + A_i (= D_i + k_i A).$$

Similarly, let B be the initially set allowed amount under the reference data. The lower threshold value is determined from the reference data $D_i$, i.e., given by $$D_i - B_i (= D_i - k_i B).$$

Figure 14:
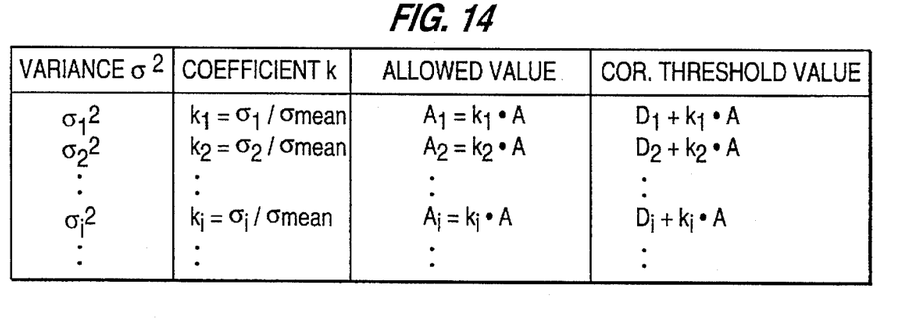
FIG. 14 is a table containing values of coefficient k and corrected threshold values used when a fourth alarm level is established.

In the third example of setting of the alarm level, the coefficient $k_i$ is determined from the relation $(\sigma_i/\sigma_{max})$. In this example, the maximum value of threshold values is taken as the initially set value. Thus, corrected threshold values are set less than this threshold value.

Where the reference data is represented in terms of absolute amount, the alarm level is set in the fourth example in the manner described now. FIG. 14 is a table of values of coefficient k and corrected threshold values used in the fourth example, where coefficient $k_i$ determining an allowed amount is given by $k_i = (\sigma_i/\sigma_{mean})$ in the same way as in the second example. In this equation, $\sigma_i$ is the standard deviation obtained as the square root of the variance $\sigma_i^2$ and $\sigma_{mean}$ is the square root of the variance $\sigma_{mean}^2$ that is the mean value of the variances $\sigma^2$ found in each process.

Let A be the initially set allowed amount above the reference data. The absolute value $A_i$ of the allowed amount is determined by the coefficient $k_i$, i.e., established from the relation $A_i = k_i \cdot A$. Thus, the allowed amount is set according to the degree of variation of the reference data. The upper threshold value is determined with respect to the reference $D_i$ by this allowed amount $A_i$, i.e., given by $$D_i + A_i (= D_i + k_i A).$$

Similarly, let B be the initially set allowed amount under the reference data. The lower threshold value is determined from the reference data $D_i$, i.e., given by $$D_i - B_i (= D_i - k_i B).$$

In the fourth example, the coefficient $k_i$ is determined from the relation $(\sigma_i/\sigma_{mean})$. First, a threshold value is set at a portion which provides mean variations. Threshold values are set above and below that portion according to the variations. In this way, corrected threshold values are set.

If necessary, the present invention can also be applied to a case in which an alarm is issued when actual measurement data T is less than the reference data D by an amount exceeding a certain value. In this way, a situation encountered where a normal machining operation is not carried out due to damage to the tool can be detected.

In the above embodiment, the coefficient k for correcting the threshold value is calculated by the load-monitoring means. Also, the allowed amount is calculated from the coefficient k by the load-monitoring means. These values may also be previously loaded into the reference data table.

The novel machining load-monitoring method can be used for monitoring machining loads on the spindle motor and on the feed axes (x, y, and z-axes) during a cutting operation. For this purpose, it is necessary that each axis control circuit be provided with an observer for estimating the disturbance load torque.

It is also possible to compare actual measurement data about the machining load on the spindle motor with corrected reference data during the cutting mode. In the fast feed mode, actual measurement data about the load on each feed axis is compared with the corrected reference data.

In the above embodiment, the machining load is monitored under control of the CPU of the CNC machine. That is, the processing depends on the software in the CNC machine. The processing may also be performed by executing the sequence program in the programmable machine controller (PMC). Furthermore, a special device for performing such processing may be connected to the CNC machine.

Also, in the above embodiment, reference data and values of variance are loaded in the reference data table shown in FIG. 1. The sampling data may also be loaded in the data table, and the reference data may be arithmetically processed by the load-monitoring means. In a further modified embodiment, corrected threshold values and alarm levels are loaded in the data table, and the load-monitoring means only acts to make comparisons with actual measurement data.

In the preferred embodiments of the invention, it is unlikely that variations in the machining load due to variations in the cutting action is misinterpreted as arising from abnormal machining. Also, wasteful stoppage of machining operation and exchange of tools can be made less frequent.

As described thus far, in the present invention, machining load can be monitored in such a way that incorrect judgment due to variations in machining load which are caused, depending on the machining conditions, is made less frequent.

What is claimed is:

1. A method of monitoring a machining load on a numerically controlled machine tool, comprising the steps of:

(a) determining reference data and variance of said reference data for the machining load from sampling data sets of the machining load obtained at a plurality of sampling times during each of multiple trial cutting operations;

(b) establishing a threshold value according to variations in said sampling data sets, using said variance associated with each of the sampling times;

(c) obtaining actual measurement data during operation of the numerically controlled machine tool; and (d) comparing said reference data with said actual measurement data at regular intervals of time as said actual measurement data is obtained in step (c) and sensing when a difference between said reference data and said actual measurement data exceeds said threshold value.

2. A method of monitoring a machining load on a numerically controlled machine tool as set forth in claim 1, wherein said reference data is a mean value of said sampling data sets.

3. A method of monitoring a machining load on a numerically controlled machine tool as set forth in claim 1, wherein said threshold value is obtained by multiplying a preset value by a coefficient that is determined by said variance associated with each of the sampling times.

4. A method of monitoring a machining load on a numerically controlled machine tool as set forth in claim 1, further comprising the step of (e) storing said sampling data in a data table prior to said determining in step (a), and wherein said reference data and said variance are determined in step (a) using the sampling data stored in step (e).

5. A method of monitoring a machining load on a numerically controlled machine tool as set forth in claim 1, further comprising the step of (e) storing said reference data and said variance in a data table prior to step (c).

6. A method of monitoring a machining load on a numerically controlled machine tool, comprising the steps of:
  (a) sampling the machining load at a plurality of sampling times during each of a plurality of trial machining operations;
  (b) obtaining mean and variance of the machining load for the sampled data at each of the sampling times;
  (c) establishing at least one threshold value for each of the sampling times based on the mean, the variance, and one of a maximum variance and a mean variance for all of the sampling times;
  (d) sampling the machining load during production operations of the numerically controlled machine tool to obtain a production load at each of the sampling times; and
  (e) generating an alarm when the production load is outside the at least one threshold value at a corresponding sampling time.

7. A method as set forth in claim 6, wherein said establishing in step (c) comprises the substeps of:
  (c1) multiplying a predetermined maximum allowance percentage times a standard deviation for each of the sampling times divided by a maximum standard deviation for all of the sampling times to obtain a corrected allowance percentage for each of the sampling times; and
  (c2) multiplying a sum of one plus the corrected allowance percentage times the mean for each of the sampling times to obtain the at least one threshold for each of the sampling times.

8. A method as set forth in claim 6, wherein said establishing in step (c) comprises the substeps of:
  (c1) multiplying a predetermined allowance percentage times the standard deviation for each of the sampling times divided by the mean standard deviation for all of the sampling times to obtain a corrected allowance percentage for each of the sampling times; and
  (c2) multiplying a sum of one plus the corrected allowance percentage times the mean for each of the sampling times to obtain the at least one threshold for each of the sampling times.

9. A method as set forth in claim 6, wherein said establishing in step (c) comprises the substeps of:
  (c1) multiplying a predetermined maximum allowance amount a standard deviation for each of the sampling times divided by a maximum standard deviation for all of the sampling times to obtain a corrected allowance amount for each of the sampling times; and
  (c2) adding the corrected allowance amount to the mean for each of the sampling times to obtain the at least one threshold for each of the sampling times.

10. A method as set forth in claim 6, wherein said establishing in step (c) comprises the substeps of:
  (c1) multiplying a predetermined allowance amount times a standard deviation for each of the sampling times divided by a standard deviation for all of the sampling times to obtain a corrected allowance amount for each of the sampling times; and
  (c2) adding the corrected allowance amount to the mean for each of the sampling times to obtain the at least one threshold for each of the sampling times.

* * * * *